US012631986B2

(12) United States Patent
Suenaga et al.

(10) Patent No.: US 12,631,986 B2
(45) Date of Patent: May 19, 2026

(54) CHARGING ROLL FOR ELECTROPHOTOGRAPHIC APPARATUS

(71) Applicant: Sumitomo Riko Company Limited, Aichi (JP)

(72) Inventors: Junichiro Suenaga, Aichi (JP); Shinkichi Kashihara, Aichi (JP); Akitoshi Morita, Aichi (JP); Takeru Horiuchi, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 0 days.

(21) Appl. No.: 19/012,927

(22) Filed: Jan. 8, 2025

(65) Prior Publication Data

US 2025/0147445 A1 May 8, 2025

Related U.S. Application Data

(63) Continuation of application No. PCT/JP2023/032605, filed on Sep. 7, 2023.

(30) Foreign Application Priority Data

Sep. 28, 2022 (JP) ................................ 2022-154914

(51) Int. Cl.
*G03G 15/02* (2006.01)

(52) U.S. Cl.
CPC ................................ *G03G 15/0233* (2013.01)

(58) Field of Classification Search
CPC ........... G03G 15/0233; G03G 15/0818; G03G 15/1685
See application file for complete search history.

(56) References Cited

U.S. PATENT DOCUMENTS

2006/0222995 A1* 10/2006 Moriyama ............. G03G 15/09 430/122.2
2014/0287899 A1* 9/2014 Nishioka ............ C08G 18/4829 399/176
2015/0018182 A1* 1/2015 Feng ....................... F16C 13/00 492/53

FOREIGN PATENT DOCUMENTS

JP 2002132020 5/2002
JP 2011053536 3/2011
JP 2014065811 4/2014
JP 2019061045 4/2019
JP 2021152563 9/2021

OTHER PUBLICATIONS

"International Search Report (Form PCT/ISA/210) of PCT/JP2023/032605", mailed on Oct. 24, 2023, with English translation thereof, pp. 1-4.
"Notice of Reasons for Refusal of Japan Counterpart Application", issued on Dec. 16, 2025, with English translation thereof, p. 1-p. 10.

* cited by examiner

*Primary Examiner* — Jessica L Eley
(74) *Attorney, Agent, or Firm* — JCIPRNET

(57) ABSTRACT

A charging roll for an electrophotographic apparatus includes a shaft body and an elastic body layer formed on an outer circumferential surface of the shaft body. The elastic body layer contains (a) to (c) below: (a) a hydrin rubber with a chlorine content of 14% or more and 19% or less; (b) an ionic conductive agent; and (c) a salt of a cyclic amidine compound. The hydrin rubber includes a crosslinking agent which is a sulfur crosslinking agent or a peroxide crosslinking agent.

6 Claims, 1 Drawing Sheet

10

CHARGING ROLL FOR ELECTROPHOTOGRAPHIC APPARATUS

CROSS-REFERENCE TO RELATED APPLICATION

The present application is a continuation of PCT/JP2023/032605, filed on Sep. 7, 2023, and is related to and claims priority from Japanese patent application no. 2022-154914, filed on Sep. 28, 2022. The entire contents of the aforementioned application are hereby incorporated by reference herein.

TECHNICAL FIELD

The disclosure relates to a charging roll for an electrophotographic apparatus that is suitably used in electrophotographic apparatuses such as copiers, printers, and facsimile machines adopting electrophotography.

RELATED ART

In a charging roll for an electrophotographic apparatus, an ionic conductive mechanism may be required for electrical uniformity and the like. For example, Patent Document 1 (Japanese Patent Application Laid-Open No. 2002-132020) describes formulating an ionic conductive agent in a base layer of the charging roll.

With continuous application of an electrical load due to energization to the charging roll, an electrical resistance of the charging roll may increase, and image defects may be generated due to decreased charging ability. This is because, upon application of an electrical load to the charging roll, the ionic conductive agent in the base layer rubber of the charging roll is polarized, and due to excessively rapid polarization of the ionic conductive agent, the polarized anions and cations are excessively biased toward the + electrode side and the – electrode side, respectively, and the ionic conductive agent decreases at a center part of the base layer rubber, which creates a portion with a high electrical resistance. If an amount of the ionic conductive agent is excessively increased to suppress excessive polarization in the base layer rubber, bleeding of the ionic conductive agent may occur, and image defects may be generated.

SUMMARY

A charging roll for an electrophotographic apparatus according to an embodiment of the disclosure includes a shaft body and an elastic body layer formed on an outer circumferential surface of the shaft body. The elastic body layer contains (a) to (c) below:

(a) a hydrin rubber with a chlorine content of 14% or more and 19% or less;

(b) an ionic conductive agent; and (c) a salt of a cyclic amidine compound.

The (c) may be a naphthoic acid salt of a cyclic amidine compound. The (c) may be included in a content of 0.1 parts by mass or more and 5.0 parts by mass or less with respect to 100 parts by mass of the (a). The (b) may be included in a content of 0.5 parts by mass or more and 3.0 parts by mass or less with respect to 100 parts by mass of the (a). The (b) may be an ammonium-based, phosphonium-based, or imidazolium-based ionic conductive agent. The (b) may be an ionic conductive agent including a sulfonate anion having a fluorine atom, a bis(sulfonyl)imide anion having a fluorine atom, or a perchlorate anion.

(1) A charging roll for an electrophotographic apparatus according to an embodiment of the disclosure includes a shaft body and an elastic body layer formed on an outer circumferential surface of the shaft body. The elastic body layer contains (a) to (c) below:

(a) a hydrin rubber with a chlorine content of 14% or more and 19% or less;

(b) an ionic conductive agent; and (c) a salt of a cyclic amidine compound.

(2) In (1) above, the (c) may be a naphthoic acid salt of a cyclic amidine compound.

(3) In (1) or (2) above, the (c) may be included in a content of 0.1 parts by mass or more and 5.0 parts by mass or less with respect to 100 parts by mass of the (a).

(4) In any one of (1) to (3) above, the (b) may be included in a content of 0.5 parts by mass or more and 3.0 parts by mass or less with respect to 100 parts by mass of the (a).

(5) In any one of (1) to (4) above, the (b) may be an ammonium-based, phosphonium-based, or imidazolium-based ionic conductive agent.

(6) In any one of (1) to (5) above, the (b) may be an ionic conductive agent including a sulfonate anion having a fluorine atom, a bis(sulfonyl)imide anion having a fluorine atom, or a perchlorate anion.

According to the charging roll for an electrophotographic apparatus of an embodiment of the disclosure, since the shaft body and the elastic body layer formed on the outer circumferential surface of the shaft body are included, and the elastic body layer contains the above (a) to (c), a resistance increase upon endurance of energization and bleeding of the ionic conductive agent are suppressed.

With the (c) being the naphthoic acid salt of the cyclic amidine compound, the effect of suppressing a resistance increase upon endurance of energization is particularly excellent.

With the content of the (c) being 0.1 parts by mass or more and 5.0 parts by mass or less with respect to 100 parts by mass of the (a), the effect of suppressing excessive polarization of the ionic conductive agent is excellent even under an electrical load due to energization. Further, bleeding of (c) is suppressed.

With the content of the (b) being 0.5 parts by mass or more and 3.0 parts by mass or less with respect to 100 parts by mass of the (a), a low resistance can be configured. Further, bleeding of (b) is suppressed.

Also, with the (b) being an ammonium-based, phosphonium-based, or imidazolium-based ionic conductive agent, since polar groups of the rubber component of (a) are readily coordinated to cations of the ionic conductive agent, and excessive polarization of the ionic conductive agent is readily suppressed even upon endurance of energization, the effect of suppressing a resistance increase upon endurance of energization is particularly excellent. Further, since the salt of the cyclic amidine compound of (c) is readily coordinated to the cations of the ionic conductive agent, and excessive polarization of the ionic conductive agent is readily suppressed even upon endurance of energization, the effect of suppressing a resistance increase upon endurance of energization is particularly excellent. Further, a low resistance is readily configured.

Also, since the ionic conductive agent including the sulfonate anion having a fluorine atom or the bis(sulfonyl) imide anion having a fluorine atom contains many fluorine groups in the structure, a basicity of the anion itself is low, and a relatively weak ionic bond is formed with the cation. Thus, these ionic conductive agents readily dissociate into ions in the rubber of (a), and a low resistance is readily configured. Further, any of these anions is hydrophobic and has a low hygroscopicity even in high humidity environments. Thus, the effect of suppressing changes in electrical resistance resulting from environmental changes is excellent. Also, the ionic conductive agent including perchlorate anions readily contributes to a low resistance.

DESCRIPTION OF EMBODIMENTS

Embodiments of the disclosure provide a charging roll for an electrophotographic apparatus in which a resistance increase upon endurance of energization and bleeding of an ionic conductive agent are suppressed.

Figure 1A:
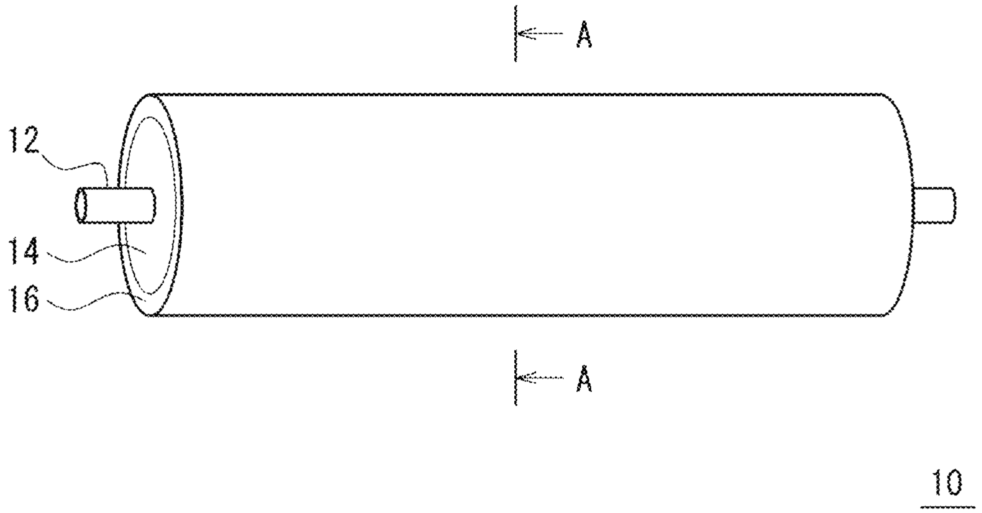
FIG. 1A is a schematic external view of a charging roll for an electrophotographic apparatus according to an embodiment of the disclosure.
Figure 1B:
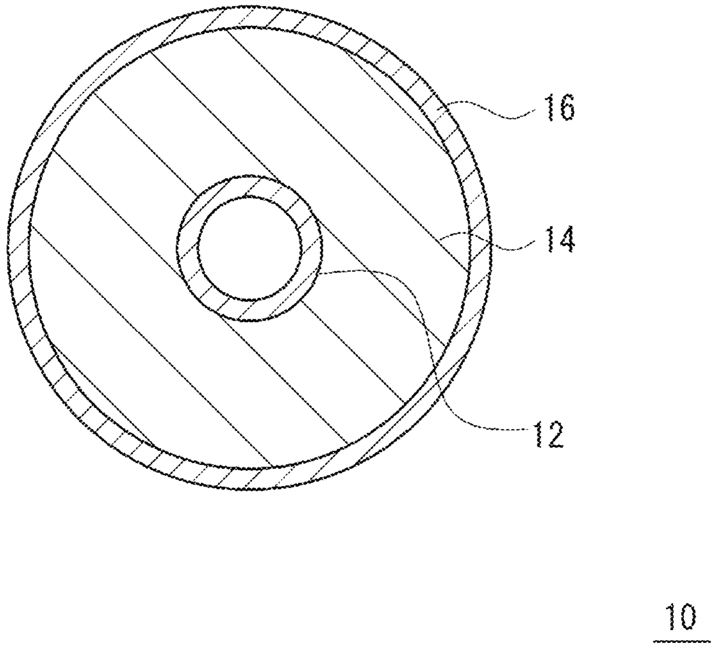
FIG. 1B is a cross-sectional view thereof taken along line A-A.

A charging roll for an electrophotographic apparatus (which may hereinafter be simply referred to as a charging roll) according to the disclosure will be described in detail. FIG. 1A is a schematic external view of a charging roll for an electrophotographic apparatus according to an embodiment of the disclosure, and FIG. 1B is a cross-sectional view thereof taken along line A-A.

A charging roll 10 includes a shaft body 12, an elastic body layer 14 formed on an outer circumferential surface of the shaft body 12, and a surface layer 16 formed on an outer circumferential surface of the elastic body layer 14. The elastic body layer 14 is a layer (base layer) serving as a base of the charging roll 10. The surface layer 16 is a layer that appears on a surface of the charging roll 10. The charging roll of the disclosure may also have a configuration without a surface layer. In other words, the charging roll may include the shaft body 12 and the elastic body layer 14 formed on the outer circumferential surface of the shaft body 12, without including the surface layer 16 on the outer circumferential surface of the elastic body layer 14.

The shaft body 12 is not particularly limited as long as it has conductivity. Specifically, examples thereof may include core metals composed of solid bodies or hollow bodies made of metals such as iron, stainless steel, aluminum, etc. The surface of the shaft body 12 may be coated with an adhesive, a primer, etc., as necessary. In other words, the elastic body layer 14 may be adhered to the shaft body 12 via an adhesive layer (primer layer). The adhesive, the primer, etc. may be made conductive as necessary.

The elastic body layer 14 contains (a) to (c) below:

(a) a hydrin rubber with a chlorine content of 14% or more and 19% or less;

(b) an ionic conductive agent; and (c) a salt of a cyclic amidine compound.

Examples of the hydrin rubber include epichlorohydrin homopolymer (CO), epichlorohydrin-ethylene oxide binary copolymer (ECO), epichlorohydrin-allyl glycidyl ether binary copolymer (GCO), epichlorohydrin-ethylene oxide-allyl glycidyl ether ternary copolymer (GECO), etc. Specifically, a ternary ECO is preferable from the viewpoint of having an appropriate polarity for coordination of the ionic conductive agent and being excellent in reactivity between a chlorine unit of the hydrin rubber and an anion portion of the salt of the cyclic amidine compound. Further, specifically, ECO and GECO, which include ethylene oxide as a copolymerization component, are more preferable, in terms of readily obtaining a low-resistance body compared to those not including ethylene oxide as the copolymerization component. Further, GCO and GECO, which include allyl glycidyl ether as a copolymerization component, have a double bond and are thus more preferable, in terms of being less prone to settling compared to those not including allyl glycidyl ether as the copolymerization component.

The chlorine content of the hydrin rubber is configured to be 14% or more and 19% or less. With the chlorine content of the hydrin rubber being less than 14%, the anion portion in the salt of the cyclic amidine compound and the chlorine unit of the hydrin rubber do not react easily, and an amount of reaction sites which effectively suppress polarization of ions of the ionic conductive agent becomes insufficient. Thus, a resistance increase due to excessive polarization of the ionic conductive agent is not suppressed. Further, from this viewpoint, the chlorine content of the hydrin rubber is preferably 15% or more, and more preferably 16% or more. On the other hand, with the chlorine content of the hydrin rubber exceeding 19%, chlorine ions of anions dissociated from the hydrin rubber react excessively with cations of the ionic conductive agent, leading to deactivation of the ionic conductive agent. Accordingly, a resistance increase is not suppressed. Further, from this viewpoint, the chlorine content of the hydrin rubber is preferably 18% or less, and more preferably 17% or less.

The hydrin rubber may be crosslinked by a crosslinking agent. The crosslinking agent is not particularly limited. Examples of the crosslinking agent may include sulfur crosslinking agents, peroxide crosslinking agents, and dechlorination crosslinking agents. These crosslinking agents may be used alone or used as a combination of two or more types.

Examples of the sulfur crosslinking agents include sulfur crosslinking agents such as powdered sulfur, precipitated sulfur, colloidal sulfur, surface-treated sulfur, insoluble sulfur, sulfur chloride, thiuram-based vulcanization accelerators, polymeric polysulfides, etc.

Examples of the peroxide crosslinking agents include peroxy ketals, dialkyl peroxides, peroxy esters, ketone peroxides, peroxy dicarbonates, diacyl peroxides, hydroperoxides, etc.

From the viewpoint of having a relatively high decomposition temperature and being capable of readily molding at higher temperatures, the peroxide crosslinking agent preferably has a decomposition temperature of 60° C. or higher in a heat accumulation storage test (BAM type: SADT) and a one-minute half-life temperature of 150° C. or higher. The one-minute half-life temperature is more preferably 160° C. or higher, and even more preferably 170° C. or higher. On the other hand, from the viewpoint of being excellent in a crosslinking speed, the one-minute half-life temperature is preferably 200° C. or lower. The one-minute half-life temperature is more preferably 190° C. or lower, and even more preferably 180° C. or lower.

Examples of preferable peroxide crosslinking agents include peroxy ketals, dialkyl peroxides, peroxy esters, etc. Examples of the peroxy ketals include 1,1-di(tert-hexylperoxy) cyclohexane, 1,1-di(tert-butylperoxy)cyclohexane, n-butyl 4,4-di(tert-butylperoxy) valerate, etc. Examples of the dialkyl peroxides include di(2-tert-butylperoxyisopropyl)benzene, dicumyl peroxide, 2,5-dimethyl-2,5-di(tert-butylperoxy) hexane, 2,5-dimethyl-2,5-di(tert-butylperoxy) hexyne-3, etc. Examples of the peroxy esters include tert-butyl peroxybenzoate, tert-hexyl peroxybenzoate, 2,5-dimethyl-2,5-di(benzoylperoxy) hexane, tert-butyl peroxy-2-ethylhexyl monocarbonate, tert-butyl peroxylaurate, tert-butyl peroxy-3,5,5-trimethylhexanoate, tert-hexyl peroxyisopropyl monocarbonate, etc. Specifically, from the viewpoint of unreacted components being less prone to remain, and boiling points of decomposition products being relatively low to readily remove the decomposition products, di(2-tert-butylperoxyisopropyl)benzene, dicumyl peroxide, 2,5-dimethyl-2,5-di(tert-butylperoxy) hexane, 1,1-di (tert-butylperoxy)cyclohexane, etc. are preferable.

Examples of the dechlorination crosslinking agents may include dithiocarbonate compounds. More specifically, examples thereof may include quinoxaline-2,3-dithiocarbonate, 6-methylquinoxaline-2,3-dithiocarbonate, 6-isopropylquinoxaline-2,3-dithiocarbonate, 5,8-dimethylquinoxaline-2,3-dithiocarbonate, etc.

From the viewpoint of being less prone to bleeding, a formulation amount of the crosslinking agent is preferably in a range of 0.1 to 2 parts by mass, more preferably in a range of 0.3 to 1.8 parts by mass, and even more preferably in a range of 0.5 to 1.5 parts by mass, with respect to 100 parts by mass of the hydrin rubber.

From the viewpoint of readily configuring the elastic body layer 14 to have a low hardness, a content of the peroxide crosslinking agent is preferably 6 parts by mass or less with respect to 100 parts by mass of the hydrin rubber, based on a pure peroxide amount conversion.

The content is more preferably 5 parts by mass or less, and even more preferably 4 parts by mass or less. Further, from the viewpoint of being excellent in a degree of crosslinking of the rubber and being less prone to settling, the content is preferably 0.2 parts by mass or more with respect to 100 parts by mass of the hydrin rubber, based on a pure peroxide amount conversion. The content is more preferably 0.4 parts by mass or more, and even more preferably 0.6 parts by mass or more.

The ionic conductive agent is not particularly limited, and may be any ionic conductive agent used in the art of electrophotographic apparatuses. Examples of the ionic conductive agent may include quaternary ammonium salts, quaternary phosphonium salts, imidazolium salts, borate salts, surfactants, etc. Specifically, quaternary ammonium salts, quaternary phosphonium salts, and imidazolium salts are particularly preferable.

Examples of cations of the quaternary ammonium salts may include those having one or two or more alkyl groups or aryl groups with approximately 1 to 18 carbon atoms (e.g., methyl group, ethyl group, propyl group, butyl group, hexyl group, octyl group, decyl group, phenyl group, xylyl group, etc.). The alkyl groups or aryl groups of the cations of the quaternary ammonium salts particularly preferably have 1 to 10 carbon atoms. Examples of anions of the quaternary ammonium salts may include halogen ions such as $F^-$, $Cl^-$, $Br^-$, $I^-$, etc., $ClO_4^-$, $BF_4^-$, $PF_6^-$, $SO_4^{2-}$, $HSO_4^-$, $C_2H_5SO_4^-$, $CF_3COO^-$, $CF_3SO_3^-$, $(CF_3SO_2)_2N^-$, $(CF_3CF_2SO_2)_2N^-$, $CF_3(CF_2)_3SO_3^-$, $(CF_3SO_2)_3C^-$, $CF_3(CF_2)_2COO^-$, etc. As the anions of the quaternary ammonium salts, $ClO_4^-$, $(CF_3SO_2)_2N^-$, $CF_3SO_3^-$, etc. are more preferable.

Examples of cations of the quaternary phosphonium salts may include those having one or two or more alkyl groups or aryl groups with approximately 1 to 18 carbon atoms (e.g., methyl group, ethyl group, propyl group, butyl group, hexyl group, octyl group, decyl group, phenyl group, xylyl group, etc.). The alkyl groups or aryl groups of the cations of the quaternary phosphonium salts particularly preferably have 1 to 10 carbon atoms. Examples of anions of the quaternary phosphonium salts may include halogen ions such as $F^-$, $Cl^-$, $Br^-$, $I^-$, etc., $ClO_4^-$, $BF_4^-$, $PF_6^-$, $SO_4^{2-}$, $HSO_4^-$, $C_2H_5SO_4^-$, $CF_3COO^-$, $CF_3SO_3^-$, $(CF_3SO_2)_2N^-$, $(CF_3CF_2SO_2)_2N^-$, $CF_3(CF_2)_3SO_3^-$, $(CF_3SO_2)_3C^-$, $CF_3(CF_2)_2COO^-$, etc. As the anions of the quaternary phosphonium salts, $ClO_4$, $(CF_3SO_2)_2N^-$, $CF_3SO_3^-$, etc. are more preferable.

Examples of the imidazolium salts may include unsubstituted imidazolium salts, 1-alkylimidazolium salts, 3-alkylimidazolium salts, 1,3-dialkylimidazolium salts, 1,2,3-trialkylimidazolium salts, etc. More specifically, examples thereof may include 1-methylimidazolium salt, 1,3-dimethylimidazolium salt, 1,3-diethylimidazolium salt, 1,3-dipropylimidazolium salt, 1,3-dibutylimidazolium salt, 1,3-dicyclohexylimidazolium salt, 1-ethyl-3-methylimidazolium salt, 1-propyl-3-methylimidazolium salt, 1-butyl-3-methylimidazolium salt, 1-hexyl-3-methylimidazolium salt, 1-ethyl-2,3-dimethylimidazolium salt, 1-propyl-2,3-dimethylimidazolium salt, 1-butyl-2,3-dimethylimidazolium salt, etc. Examples of anions of the imidazolium salts may include halogen ions such as $F^-$, $Cl^-$, $Br^-$, $I^-$, etc., $ClO_4^-$, $BF_4^-$, $PF_6^-$, $SO_4^-$, $HSO_4^-$, $C_2H_5SO_4^-$, $CF_3COO^-$, $CF_3SO_3^-$, $(CF_3SO_2)_2N^-$, $(CF_3CF_2SO_2)_2N^-$, $CF_3(CF_2)_3SO_3^-$, $(CF_3SO_2)_3C^-$, $CF_3(CF_2)_2COO^-$, etc. As the anions of the imidazolium salts, $ClO_4^-$, $(CF_3SO_2)_2N^-$, $CF_3SO_3^-$, etc. are more preferable.

Examples of the borate salts may include those having one or two or more alkyl groups or aryl groups with approximately 1 to 18 carbon atoms (e.g., methyl group, ethyl group, propyl group, butyl group, hexyl group, octyl group, decyl group, phenyl group, xylyl group, etc.) and including alkali metal ions or alkaline earth metal ions such as lithium ion, sodium ion, potassium ion, calcium ion, etc.

From the viewpoint of readily configuring a low resistance and readily suppressing a resistance increase upon endurance of energization, a content of the ionic conductive agent is preferably 0.5 parts by mass or more with respect to 100 parts by mass of the hydrin rubber. The content is more preferably 0.7 parts by mass or more, and even more preferably 1.0 part by mass or more. Further, from the viewpoint of readily suppressing bleeding of the ionic conductive agent, the content is preferably 3.0 parts by mass or less with respect to 100 parts by mass of the hydrin rubber. The content is more preferably 2.5 parts by mass or less, and even more preferably 2.0 parts by mass or less.

The cyclic amidine compound is a cyclic compound that includes an amidine structure in its structure. An anion side of the salt of the cyclic amidine compound reacts with the chlorine unit of the hydrin rubber. Since this reaction site has an appropriate polarity for readily coordinating the ions (cations) of the ionic conductive agent, excessive polarization of the ionic conductive agent can be suppressed, and a resistance increase upon endurance of energization can be suppressed. From the viewpoint of being excellent in reactivity with the chlorine unit of the hydrin rubber, the anion side of the salt of the cyclic amidine compound preferably has a hydroxyl group or a carboxyl group. In the salt of the cyclic amidine compound, a portion (basic part) of the cyclic amidine compound functions as a catalyst to increase the reactivity between the anion side of the salt of the cyclic amidine compound and the chlorine unit. Thus, it is effective to formulate as a naphthoic acid salt of the cyclic amidine compound and the like rather than formulating a naphthoic acid and the like alone, with respect to the hydrin rubber.

From the viewpoint of availability, bicyclic amidine compounds are preferable as the cyclic amidine compound. Examples of the cyclic amidine compound include diazabicycloundecene (1,8-diazabicyclo[5.4.0]undec-7-ene), diazabicyclononene (1,5-diazabicyclo[4.3.0]non-5-ene), etc. As the cyclic amidine compound, diazabicycloundecene is more preferable from the viewpoint of catalytic ability, storage stability, etc.

From the viewpoint of being excellent in reactivity with the chlorine unit of the hydrin rubber, as the salt of the cyclic amidine compound, naphthoic acid salt of cyclic amidine compound, phenol resin salt of cyclic amidine compound, aliphatic carboxylic acid salt, phenol salt, borate salt, etc. are preferable. Specifically, from the viewpoint of being especially excellent in the effect of suppressing a resistance increase upon endurance of energization, naphthoic acid salt of cyclic amidine compound is particularly preferable.

From the viewpoint of being excellent in the effect of suppressing excessive polarization of the ionic conductive agent even under an electrical load due to energization, a content of the salt of the cyclic amidine compound is preferably 0.1 parts by mass or more with respect to 100 parts by mass of the hydrin rubber. The content is more preferably 0.3 parts by mass or more, and even more preferably 0.5 parts by mass or more. Further, from the viewpoint of suppressing bleeding of the salt of the cyclic amidine compound, the content is preferably 5.0 parts by mass or less with respect to 100 parts by mass of the hydrin rubber. The content is more preferably 4.0 parts by mass or less, and even more preferably 3.0 parts by mass or less.

The rubber composition may include another additive and the like as necessary. Examples of the another additive and the like include electronic conductive agents, lubricants, antioxidants, light stabilizers, viscosity adjusters, processing aids, flame retardants, plasticizers, fillers, dispersants, pigments, release agents, etc.

Examples of the electronic conductive agents include carbon black, graphite, conductive titanium oxide, conductive zinc oxide, conductive tin oxide, etc.

A thickness of the elastic body layer 14 is not particularly limited, but is preferably in a range of 0.1 to 10 mm, more preferably in a range of 0.5 to 5 mm, and even more preferably in a range of 1 to 3 mm.

A volume resistivity of the elastic body layer 14 is not particularly limited, but is preferably in a range of $10^2$ to $10^{10}$ Ω·cm, more preferably in a range of $10^3$ to $10^9$ Ω·cm, and even more preferably in a range of $10^4$ to $10^8$ Ω·cm.

The surface layer 16 may function as a protective layer and the like of the roll surface. The surface layer 16 preferably includes a polymer component as a main material, such as polyamide, polyurethane, acrylic resin, alkyd resin, phenol resin, fluorine resin, silicone resin, modified products thereof, etc. Examples of modifying groups in the modified products may include N-methoxymethyl group, silicone group, fluorine group, etc. These polymer components may be included as one type alone or as a combination of two or more types, as the surface layer material. The polymer component of the surface layer 16 may be crosslinked.

To impart conductivity to the surface layer 16, a conductive agent such as carbon black, graphite, conductive titanium oxide, conductive zinc oxide, conductive tin oxide, ionic conductive agents (e.g., quaternary ammonium salts, borate salts, surfactants, etc.) may be added as appropriate. Further, various additives may be appropriately added as necessary. Further, a roughness forming particle may be added to ensure a surface roughness.

The roughness forming particle forms a surface roughness on the surface layer 16. Examples of the roughness forming particle may include resin particles, silica particles, etc. Examples of the resin particles may include urethane particles, silicone particles, acrylic particles, etc. An average particle diameter of the roughness forming particle is preferably in a range of 3 to 50 μm. The average particle diameter of the roughness forming particle may be calculated based on a median diameter measured by a laser diffraction particle size distribution analyzer.

A thickness of the surface layer 16 is not particularly limited, but is preferably in a range of 0.01 to 100 μm, more preferably in a range of 0.1 to 20 μm, and even more preferably in a range of 0.3 to 10 μm. A volume resistivity of the surface layer 16 is preferably in a range of $10^7$ to $10^{12}$ Ω·cm, more preferably in a range of $10^8$ to $10^{11}$ Ω·cm, and even more preferably in a range of $10^9$ to $10^{10}$ Ωcm.

The charging roll 10 may be manufactured, for example, as follows. First, a shaft body 12 is coaxially disposed at a hollow part of a roll molding mold, and a rubber composition is injected, heated and cured, and then demolded, or, the rubber composition is extrusion-molded on the surface of the shaft body 12, to form an elastic body layer 14 on an outer circumference of the shaft body 12. Next, a surface layer forming composition is coated to an outer circumference of the formed elastic body layer 14, and UV irradiation or heat treatment is performed as necessary, to form a surface layer 16. Accordingly, the charging roll 10 can be manufactured.

The surface layer forming composition is composed of one containing the above main material, a conductive agent, and another additive which is included as necessary. Examples of the another additive may include crosslinking agents for the polymer component, leveling agents, surface modifying agents, etc. From the viewpoint of adjusting a viscosity and the like, the surface layer forming composition may include, as appropriate, solvents such as organic solvents like methyl ethyl ketone, toluene, acetone, ethyl acetate, butyl acetate, methyl isobutyl ketone (MIBK), THF, DMF, etc., water-soluble solvents like methanol, ethanol, etc. As the coating method, various coating methods may be applied, such as a roll coating method, a dipping method, a spray coating method, etc.

According to the charging roll 10 with the above configuration, since the elastic body layer 14 contains (a) a hydrin rubber with a chlorine content of 14% or more and 19% or less, (b) an ionic conductive agent, and (c) a salt of a cyclic amidine compound, a resistance increase upon endurance of energization and bleeding of the ionic conductive agent are suppressed. This is inferred to be due to the following mechanism. Namely, the anion side of the salt of the cyclic amidine compound reacts with the chlorine unit of the hydrin rubber, and by coordinating the ions (cations) of the ionic conductive agent to the reaction site, excessive polarization of the ionic conductive agent is suppressed even under an electrical load due to energization. Accordingly, a resistance increase upon endurance of energization is suppressed. Further, since excessive polarization of the ionic conductive agent is not suppressed by increasing the amount of the ionic conductive agent, bleeding of the ionic conductive agent is also suppressed.

With the chlorine content of the hydrin rubber being less than 14%, the anion portion in the salt of the cyclic amidine compound and the chlorine unit of the hydrin rubber do not react easily, and an amount of reaction sites which effectively suppress polarization of ions of the ionic conductive agent becomes insufficient. Thus, a resistance increase due to excessive polarization of the ionic conductive agent is not suppressed. On the other hand, with the chlorine content of the hydrin rubber exceeding 19%, chlorine ions of anions dissociated from the hydrin rubber excessively react with the cations of the ionic conductive agent, leading to deactivation of the ionic conductive agent. Accordingly, a resistance increase is not suppressed. Thus, the chlorine content of the hydrin rubber is configured to be 14% or more and 19% or less.

Also, with the ionic conductive agent being an ammonium-based, phosphonium-based, or imidazolium-based ionic conductive agent, since the polar groups of the hydrin rubber are readily coordinated to the cations of the ionic conductive agent, and excessive polarization of the ionic conductive agent is readily suppressed even upon endurance of energization, the effect of suppressing a resistance increase upon endurance of energization is particularly excellent. Further, since the salt of the cyclic amidine compound is readily coordinated to the cations of the ionic conductive agent, and excessive polarization of the ionic conductive agent is readily suppressed even upon endurance of energization, the effect of suppressing a resistance increase upon endurance of energization is particularly excellent. Further, a low resistance is easily configured.

Also, with the ionic conductive agent being an ionic conductive agent including a sulfonate anion having a fluorine atom or a bis(sulfonyl)imide anion having a fluorine atom, since many fluorine groups are included in the structure, a basicity of the anion itself is low, and a relatively weak ionic bond is formed with the cation. Thus, these ionic conductive agents readily dissociate into ions in the rubber of the hydrin rubber, and a low resistance is readily configured. Further, any of these anions is hydrophobic and has a low hygroscopicity even in high humidity environments. Thus, the effect of suppressing changes in electrical resistance resulting from environmental changes is excellent. Also, an ionic conductive agent including perchlorate anions readily contributes to a low resistance.

EXAMPLES

Hereinafter, the disclosure will be described in detail with reference to Examples and Comparative Examples.

Example 1

<Preparation of Rubber Composition>

100 parts by mass of a hydrin rubber <1>, 3 parts by mass of a peroxide crosslinking agent (Peroxymon F40) (1.2 parts by weight based on a pure material amount conversion), 5 parts by mass of an acid acceptor, 1.0 part by mass of an ionic conductive agent, and 2 parts by mass of a salt of a cyclic amidine compound (naphthoic acid salt of diazabicycloundecene) were stirred and mixed using a stirrer to prepare a rubber composition.

<Formation of Elastic Body Layer>

A core metal (6 mm in diameter) was set in a molding mold, and the above rubber composition was injected at 120° C., and heated at 175° C. for 30 minutes to crosslink the rubber composition. Subsequently, cooling and demolding were performed to form an elastic body layer with a thickness of 2 mm on the outer circumference of the core metal.

<Formation of Surface Layer>

100 parts by mass of a N-methoxymethylated nylon ("EF30T" manufactured by Nagase ChemteX Corporation), 60 parts by mass of a conductive tin oxide ("S-2000" manufactured by Mitsubishi Materials Corporation), 1 part by mass of a citric acid, and 300 parts by mass of a methanol were mixed to prepare a surface layer forming composition. Subsequently, the surface layer forming composition was roll-coated onto the surface of the elastic body layer and heated at 120° C. for 50 minutes to form a surface layer with a thickness of 10 μm on the outer circumference of the elastic body layer. Accordingly, a charging roll was produced.

Example 2

A charging roll was produced in the same manner as in Example 1, except that the type of the hydrin rubber was changed in the preparation of the rubber composition.

Example 3 to Example 4

Charging rolls were produced in the same manner as in Example 1, except that the type of the salt of the cyclic amidine compound was changed in the preparation of the rubber composition.

Example 5 to Example 7

Charging rolls were produced in the same manner as in Example 1, except that the formulation amount of the salt of the cyclic amidine compound was changed in the preparation of the rubber composition.

Example 8 to Example 9

Charging rolls were produced in the same manner as in Example 1, except that the formulation amount of the ionic conductive agent was changed in the preparation of the rubber composition.

Comparative Example 1

A charging roll was produced in the same manner as in Example 1, except that the salt of the cyclic amidine compound was not included in the preparation of the rubber composition.

Comparative Example 2

A charging roll was produced in the same manner as in Example 2, except that the salt of the cyclic amidine compound was not included and the formulation amount of the ionic conductive agent was changed in the preparation of the rubber composition.

Comparative Example 3

A charging roll was produced in the same manner as in Example 1, except that the type of the hydrin rubber was changed in the preparation of the rubber composition.

Comparative Example 4

A charging roll was produced in the same manner as in Example 1, except that the cyclic amidine compound was included without including the salt of the cyclic amidine compound in the preparation of the rubber composition.

Comparative Example 5

A charging roll was produced in the same manner as in Example 1, except that a naphthoic acid was included without including the salt of the cyclic amidine compound in the preparation of the rubber composition.

The following materials were prepared as materials of the rubber composition.

Hydrin rubber <1> (chlorine content 14%): "Epion 301" manufactured by Osaka Soda Hydrin rubber <2> (chlorine content 19%): "Hydrin T3108" manufactured by Zeon Corporation Hydrin rubber <3> (chlorine content 28%): "Hydrin T3105" manufactured by Zeon Corporation Crosslinking agent: "Peroxymon F40" manufactured by NOF Corporation Diazabicycloundecene salt <1>: 3-hydroxy-2-naphthoic acid salt of 1,8-diazabicyclo(5.4.0)undecene-7

Diazabicycloundecene salt <2>: phenol resin salt of 1,8-diazabicyclo(5.4.0)undecene-7

Diazabicyclononene salt: phenol resin salt of 1,5-diazabicyclo(4.3.0)nonene-5

Diazabicycloundecene: 1,8-diazabicyclo(5.4.0)undecene-7

Naphthoic acid: 3-hydroxy-2-naphthoic acid

Acid acceptor: "DHT-4A" manufactured by Kyowa Chemical Industry Co., Ltd.

Ionic conductive agent: "Tetrabutylammonium triflate" manufactured by Tokyo Chemical Industry Co., Ltd.

The charging rolls produced were evaluated in terms of a resistance change upon endurance of energization and bleeding of the ionic conductive agent.

<Evaluation Method of Resistance Change Upon Energization>

A load of 700 g was applied to one end of the charging roll on a metal drum of ϕ30 mm. The metal drum was rotated at 90 rpm, and an energization test was conducted to obtain a cumulative current of 120 C (energization conditions: 1000 Hz, 0.19 kVpp, and 1500 μA constant current control). Resistance values before and after the test were obtained, and a resistance change was calculated in orders of magnitude. The resistance change was indicated as "A" in the case of being less than 0.3 orders of magnitude, "B" in the case of being 0.3 or more and less than 0.5 orders of magnitude, "C" in the case of being 0.5 or more and less than 1.0 order of magnitude, and "D" in the case of being 1.0 or more order of magnitude.

<Evaluation Method of Bleeding>

After the charging roll was placed in a humid and hot environment at 40° C. for 30 days, whether bleeding substance was present on the surface of the charging roll was observed. The case where no bleeding substance was observed was indicated as "○", and the case where bleeding substance was observed was indicated as "x".

In Examples, an elastic body layer is formed from a rubber composition containing a hydrin rubber with a chlorine content of 14% or more and 19% or less, an ionic conductive agent, and a salt of a cyclic amidine compound. According to Examples, a resistance increase due to polarization of the ionic conductive agent is small upon endurance of energization. Also, no bleeding of the ionic conductive agent is observed.

In contrast, Comparative Example 1 does not include the salt of the cyclic amidine compound in the rubber composition of the elastic body layer containing the hydrin rubber and the ionic conductive agent. According to Comparative Example 1, a resistance increase upon endurance of energization is large. Comparative Example 2 does not include the salt of the cyclic amidine compound in the rubber composition of the elastic body layer containing the hydrin rubber and the ionic conductive agent. Further, the amount of the ionic conductive agent is greater than in Comparative Example 1. According to Comparative Example 2, a resistance increase upon endurance of energization is suppressed to be smaller than in Comparative Example 1, but bleeding of the ionic conductive agent is not suppressed. In Comparative Example 3, the chlorine content of the hydrin rubber is high in the rubber composition of the elastic body layer. According to Comparative Example 3, a resistance increase upon endurance of energization is large. Comparative Example 4 includes the cyclic amidine compound instead of the salt of the cyclic amidine compound in the rubber composition of the elastic body layer containing the hydrin rubber and the ionic conductive agent. According to Comparative Example 4, a resistance increase upon endurance of energization is large. Comparative Example 5 includes the naphthoic acid instead of the salt of the cyclic amidine compound in the rubber composition of the elastic body layer containing the hydrin rubber and the ionic conductive agent. According to Comparative Example 5, a resistance increase upon endurance of energization is large.

Thus, based on Examples and Comparative Examples, it is learned that, by forming the elastic body layer of the charging roll from the rubber composition containing the hydrin rubber with a chlorine content of 14% or more and 19% or less, the ionic conductive agent, and the salt of the cyclic amidine compound, a resistance increase upon endurance of energization and bleeding of the ionic conductive agent are suppressed.

Also, in the comparison among Examples, based on Example 1, Example 3, and Example 4, it is learned that, among the salts of the cyclic amidine compound, the naph-

TABLE 1

| | Example | | | | | | | | | Comparative Example | | | | |
|---|---|---|---|---|---|---|---|---|---|---|---|---|---|---|
| | 1 | 2 | 3 | 4 | 5 | 6 | 7 | 8 | 9 | 1 | 2 | 3 | 4 | 5 |
| Hydrin rubber <1> (chlorine content 14%) | 100 | — | 100 | 100 | 100 | 100 | 100 | 100 | 100 | 100 | — | — | 100 | 100 |
| Hydrin rubber <2> (chlorine content 19%) | — | 100 | — | — | — | — | — | — | — | — | 100 | — | — | — |
| Hydrin rubber <3> (chlorine content 28%) | — | — | — | — | — | — | — | — | — | — | — | 100 | — | — |
| Crosslinking agent | 3 | 3 | 3 | 3 | 3 | 3 | 3 | 3 | 3 | 3 | 3 | 3 | 3 | 3 |
| Diazabicycloundecene salt <1> | 2.0 | 2.0 | — | — | 0.1 | 0.5 | 5.0 | 2.0 | 2.0 | — | — | 2.0 | — | — |
| Diazabicycloundecene salt <2> | — | — | 2.0 | — | — | — | — | — | — | — | — | — | — | — |
| Diazabicycloundecene | — | — | — | — | — | — | — | — | — | — | — | — | 2.0 | — |
| Naphthoic acid | — | — | — | — | — | — | — | — | — | — | — | — | — | 2.0 |
| Diazabicyclononene salt | — | — | — | 2.0 | — | — | — | — | — | — | — | — | — | — |
| Acid acceptor | 5 | 5 | 5 | 5 | 5 | 5 | 5 | 5 | 5 | 5 | 5 | 5 | 5 | 5 |
| Ionic conductive agent | 1.0 | 1.0 | 1.0 | 1.0 | 1.0 | 1.0 | 1.0 | 3.0 | 0.5 | 1.0 | 3.0 | 1.0 | 1.0 | 1.0 |
| Resistance change | A | A | B | B | C | A | A | A | B | D | B | D | D | D |
| Bleeding | ○ | ○ | ○ | ○ | ○ | ○ | ○ | ○ | ○ | ○ | x | ○ | ○ | ○ |

thoic acid salt of the cyclic amidine compound is excellent in the effect of suppressing a resistance increase upon endurance of energization. Further, based on Example 1, Example 5, Example 6, and Example 7, it is learned that, with the formulation amount of the salt of the cyclic amidine compound being 0.5 parts by mass or more and 5 parts by mass or less with respect to 100 parts by mass of the hydrin rubber, the effect of suppressing a resistance increase upon endurance of energization is excellent. Further, based on Example 1, Example 8, and Example 9, it is learned that, with the formulation amount of the ionic conductive agent being 1.0 part by mass or more and 3.0 parts by mass or less with respect to 100 parts by mass of the hydrin rubber, the effect of suppressing a resistance increase upon endurance of energization is excellent.

Although the embodiments and Examples of the disclosure have been described above, the disclosure is not limited to the above embodiments and Examples in any manner, and various modifications may be made within the scope without deviating from the spirit of the disclosure.

The invention claimed is:

1. A charging roll for an electrophotographic apparatus comprising a shaft body and an elastic body layer formed on an outer circumferential surface of the shaft body, wherein the elastic body layer contains (a) to (c) below:

(a) a hydrin rubber with a chlorine content of 14% or more and 19% or less;

(b) an ionic conductive agent; and (c) a salt of a cyclic amidine compound, and the hydrin rubber comprises a crosslinking agent which is a sulfur crosslinking agent or a peroxide crosslinking agent, wherein the (c) is included in a content of 0.1 parts by mass or more and 5.0 parts by mass or less with respect to 100 parts by mass of the (a).

2. The charging roll for an electrophotographic apparatus according to claim 1, wherein the (c) is a naphthoic acid salt of a cyclic amidine compound.

3. The charging roll for an electrophotographic apparatus according to claim 1, wherein the (b) is included in a content of 0.5 parts by mass or more and 3.0 parts by mass or less with respect to 100 parts by mass of the (a).

4. The charging roll for an electrophotographic apparatus according to claim 1, wherein the (b) is an ammonium-based, phosphonium-based, or imidazolium-based ionic conductive agent.

5. The charging roll for an electrophotographic apparatus according to claim 1, wherein the (b) is an ionic conductive agent comprising a sulfonate anion having a fluorine atom, a bis (sulfonyl) imide anion having a fluorine atom, or a perchlorate anion.

6. A charging roll for an electrophotographic apparatus comprising a shaft body and an elastic body layer formed on an outer circumferential surface of the shaft body, wherein the elastic body layer contains (a) to (c) below:

(a) a hydrin rubber with a chlorine content of 14% or more and 19% or less;

(b) an ionic conductive agent; and (c) a salt of a cyclic amidine compound, and the hydrin rubber comprises a crosslinking agent which is a sulfur crosslinking agent or a peroxide crosslinking agent, wherein the (b) is included in a content of 0.5 parts by mass or more and 3.0 parts by mass or less with respect to 100 parts by mass of the (a).

* * * * *